United States Patent

[11] 3,550,773

[72] Inventors Gerard J. Villani;
  Allen L. Klibanoff, Boston, Mass.
[21] Appl. No. 596,483
[22] Filed Nov. 23, 1966
[45] Patented Dec. 29, 1970
[73] Assignee National Research Corporation
  Newton Highlands, Mass.
  a corporation of Massachusetts

[54] SIZE SEPARATION OF FINE POWDERS BY COLUMN ELUTRIATION
  2 Claims, 3 Drawing Figs.
[52] U.S. Cl. .................................................. 209/138,
  209/158, 209/154
[51] Int. Cl. .................................................. B07b 3/00,
  B03b 3/34
[50] Field of Search .......................................... 209/138-
  —141, 158—161, 154, 155, 133

[56] References Cited
  UNITED STATES PATENTS
  661,997  11/1900  Jordan ........................  209/158
  859,194  7/1907   Blasco ........................  209/138X
  2,621,034 12/1952 Stecker ......................  209/138X
  2,708,517 5/1955  Evans ........................  209/158
  2,959,284 11/1960 Molstedt .....................  209/138
  3,062,458 11/1962 Dearing ......................  209/138X
  FOREIGN PATENTS
  451,942  8/1936   Great Britain ...............  209/159

*Primary Examiner*—Frank W. Lutter
*Assistant Examiner*—Robert Halper
*Attorneys*—Oliver W. Hayes and Jerry Cohen

ABSTRACT: Apparatus for elutriating powders comprises a vertical tubular column having means for increasing the fluid velocity along a longitudinally central zone of the column.

SIZE SEPARATION OF FINE POWDERS BY COLUMN ELUTRIATION

The present invention relates to fluid classification of fine, subsieve powders by elutriation in a column either on a batch or continuous basis.

It is the object of the invention to provide improved apparatus for separation of powders of high density metals and natural and synthetic minerals in the subsieve size range, making precise size separations anywhere in this range and affording higher percentage yields per run, on the coarse and fine sides of the size cut, than prior art apparatus, consistent with very high throughput.

The invention is now described with reference to the accompanying drawing in which.

Figures 1, 2:
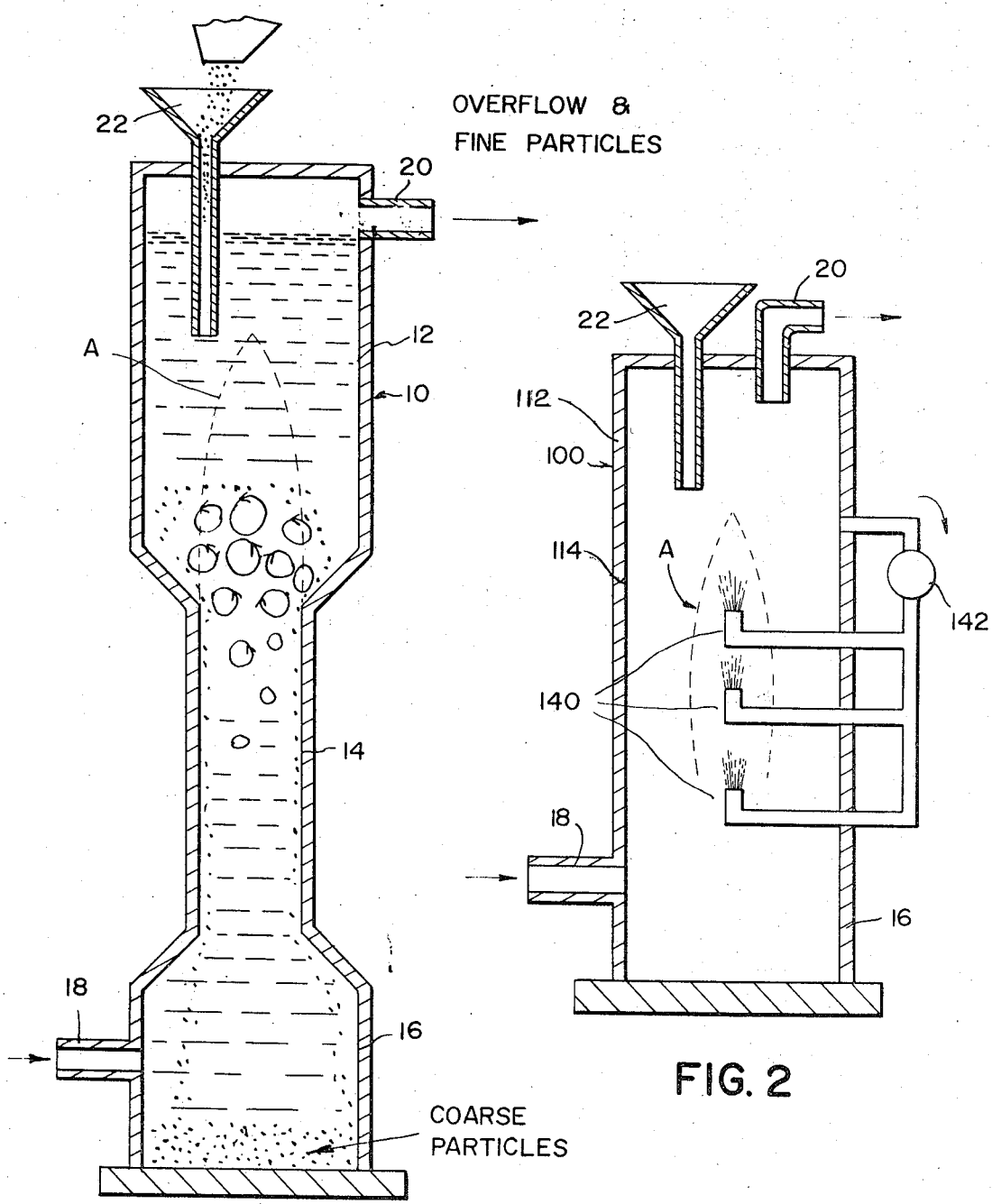
FIG. 1 is a diagrammatic representation of improved elutriation apparatus according to a preferred embodiment of the invention.
FIG. 2 is a diagrammatic representation of a second embodiment of the invention.

In FIG. 1 the vertical elutriation column is indicated at 10 and has an upper fine powder separation zone indicated at 12, a lower coarse powder collection portion indicated at 16 and a central necked down portion at 14. An eluting fluid (usually water) is fed in at 18 and removed at 20 carrying fine powders in the overflow. Powders to be classified are fed in at 22.

The heart of the present improvement is the necked down portion shown at 14 which has a diameter of between 20 and 80 percent of the zone 12 diameter. The length of the necked down zone should be at least twice the diameter of the necked down zone and less than 20 times the diameter of the necked down zone. Lower size cuts can be made and separating efficiency can be improved through the use of this feature.

The diameter of upper column portion 12 is set according to the size cut and feed rate desired under conventional design practice. The desired separation size is used to determine flow rate using Stokes's law as a guide. Stokes law gives:

$$v = \frac{g\, a^2\, (d_1 - d_2)}{18\, n}$$

where $g$ is gravitation acceleration, $a$ is diameter of the powders at the desired separation size, $d_1$ is the particle density, $d_2$ is the elutriating fluid density and $n$ is the fluid viscosity and $v$ is the terminal velocity of the particles of cut point size. Larger particles have higher velocity. The fluid flow rate is set equal to terminal velocity and the cross section area of the column can then be determined depending on production rates desired. This analysis is essentially correct for the full length of prior art columns and the separation zone 12 of the FIG. 1 column. In practice corrections are made on an experimental basis to allow for particle shape factors and velocity profile across the column.

Turning to the special neck portion 14 of FIG. 1, the fluid velocity therein will be a multiple of the zone 12 velocity in inverse proportion to the ratio of their respective diameters squared. Thus, it would seem that the presence of the neck portion 14 would substantially prevent particles slightly larger than the cut point from reaching the collection portion 16. But it has been observed that, surprisingly, such a buildup of oversize particles does not occur above the neck. For instance, separation zone 12 might be designed for a separation size of 20 microns and if the ratio of diameter of 12 to diameter of 14 were 2, the velocity ratio would suggest a new cut point of 40 microns in neck 14 and a hold-up of 20—40 micron particles above neck 14. But this does not occur. Particles between 20 and 40 microns pass along the wall of neck 14 and are also transmitted through eddy currents established in neck 14 and extending into separation zone 12. Delays in transit (longer residence time of powders at separation zone 12) caused by the high velocity of fluid in neck 14 and the turbulence allow a very efficient separation of particles above and below the design cut point. Also, the high velocity stream formed in neck 14 breaks up powder agglomerates.

Increasing the length of the neck 14 increases the separation efficiency and allows handling of greater rates of powder feed at 22.

Referring now to FIG. 2, the column 100 now has a straight design but has a central section 114 with high speed jet nozzles 140 fed by pump 142 which withdraws fluid from the column and feeds it to the nozzles 140.

In both the species of FIG. 1 and FIG. 2, the velocity of the upwardly moving column of fluid is increased along a longitudinally central zone of said column defined at A in FIGS. 1 and 2. This localized increase in velocity causes a great turbulence which provides effective separation at the original cut point of the column. the mechanisms of separation are functionally the same in the species of FIG. 1 and FIG. 2.

Figure 3:
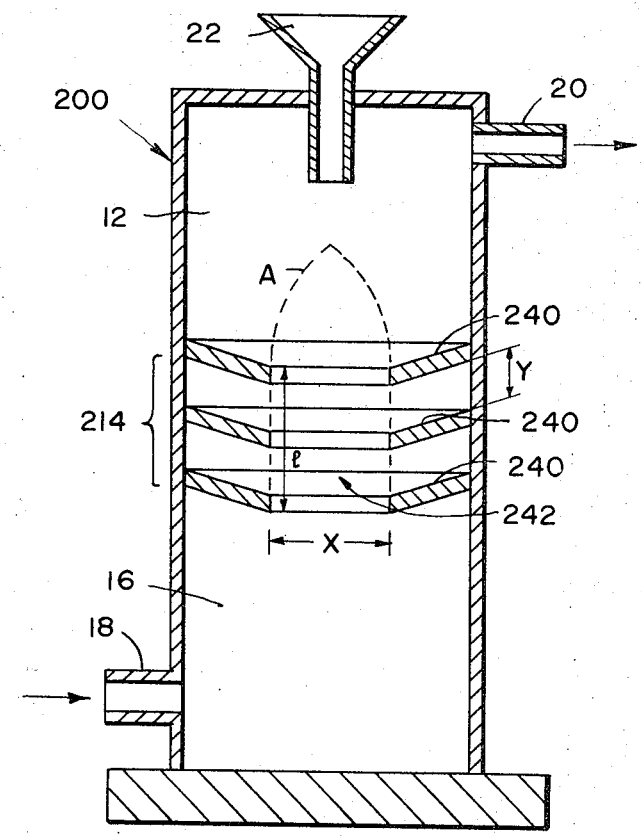
FIG. 3 is a diagrammatic representation of a third embodiment of the invention.

A third embodiment of the invention is shown in FIG. 3. The column 200 now has a straight design but has a longitudinally central section 214 formed by a series of conical baffles 240. The baffles form an apparent neck 242 where fluid velocity is increased. Separation of powders via turbulence and wall friction is carried out in the space between baffles 240 as well as in the apparent neck 242 and above the apparent neck. The number of baffles used is noncritical. Generally, the spacing $y$ between baffles should be less than twice the diameter $x$ of the "neck" 242, and preferably less than half the diameter $x$. Referring to the criterion of length of central zone ($1 = 2x$ to $20x$) the number of baffles can be determined. If a length of central zone is set at $1 = 8x$, for instance, and the baffle spacing is set at $y=0.5x$, then the number of baffles is $8x$ divided by $0.5x$; i.e., 40. The use of baffles can increase separation efficiency compared to the species of FIG. 1, but involves some extra materials and labor in construction, as is apparent from the drawings. However, the extra efficiency can be traded for length to allow shortening or narrowing the column length where desired and, in some plants, such space savings are very useful.

While several embodiments have been described it will be apparent that several other embodiments will become apparent to those skilled in the art once given the benefit of the present disclosure. For instance, the zones 14, 114, 214 could be staggered to one side rather than coaxial with the column as a whole. As another modification, the necks 14, 214, might be noncircular; in such case, "diameter" as used herein could be extrapolated from the average cross section dimension or area of such equivalent embodiments. It is therefore intended that the above disclosure shall be read as illustrative and not in a limiting sense.

We claim:

1. An improved elutriation apparatus for high production rate fluid classification of high density metal and mineral powders comprising a tubular, vertically arranged elongated column with mixed powder feeding means and fine powder collection means located at the upper end thereof, coarse powder collection means located at the lower end thereof and a series of jet nozzle outlets located in a longitudinally central portion thereof, the jet nozzle outlets being arranged in a longitudinal line, and fluid pump means for feeding fluid to said nozzles, said fluid pump means having an inlet connected to the column and means for feeding eluting fluid to said lower tube portion.

2. An improved elutriation apparatus for high production rate classification of high density metal and mineral powders comprising a tubular vertically arranged elongated column with an upper elongated fine powder separation zone, a lower coarse powder collection zone and a longitudinally central elongated tube portion, the said central column portion having a series of annular baffles therein, in a longitudinally arranged array, the baffles extending from the column wall transversely towards the center thereof and leaving a central circular opening therein, the separation between baffles being no greater than twice the baffle opening diameter, the baffles extending downwardly as well as transversely to provide a conical form, means for feeding mixed coarse and fine powders into the said upper column portion, means for feeding an eluting fluid into the lower column portion and means for collecting coarse powders in the lower column portion.